April 27, 1937. B. N. SMITH 2,078,464
HOSE GRIP
Filed March 4, 1936
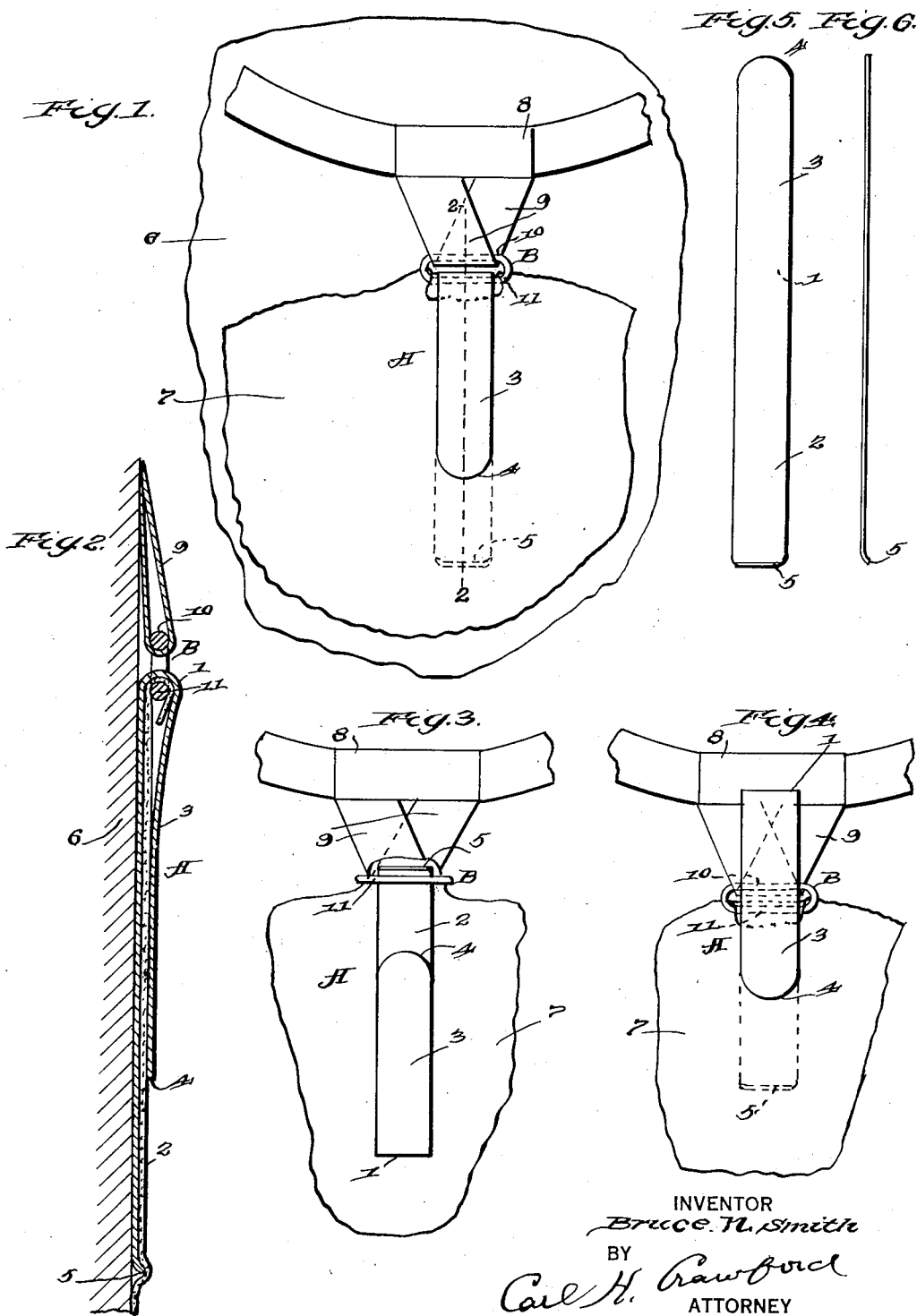

Patented Apr. 27, 1937

2,078,464

UNITED STATES PATENT OFFICE 2,078,464

HOSE GRIP

Bruce N. Smith, Seattle, Wash.

Application March 4, 1936, Serial No. 67,098

2 Claims. (Cl. 24—259)

This invention relates to improvements in hose grips and is an improvement over the device disclosed in my prior patent issued November 26, 1935, No. 2,022,158, for Hose grips.

An object of the present invention is not only to greatly simplify the grip but also to provide a grip that is more easily attached to and detached from the hose, and one in which the hose is more securely connected, and in which the liability of injuring the hose is very greatly reduced.

A further object is to provide a grip of greatly reduced thickness, thereby serving to materially reduce the resulting bulge heretofore considered unavoidable.

An object of the invention is to provide a grip which will securely anchor the hose by only gripping a limited marginal portion thereof.

A special feature resides in providing a two-part gripping and supporting device in which one member, which I may term the passive member, is adapted to receive a marginal portion of the hose, and the other member, which I may term the positive member, coacts with the passive member to securely hold such marginal portion of the hose.

The invention has many other objects and features which will be more fully described by reference to the accompanying drawing and which will be more particularly pointed out in and by the appended claims.

In the drawing:—

Fig. 1 is a front view of the device of my invention showing how it is applied in the function of gripping and supporting a stocking.

Fig. 2 is a sectional view on line 2—2 of Fig. 1.

Fig. 3 is a view showing how the positive member may be manipulated to insert a marginal portion of the hose into the passive member of the device.

Fig. 4 is a similar view showing how the positive member is advanced into a final position after the hose has been inserted into the passive member.

Fig. 5 is a face view of the blank from which the positive member is formed.

Fig. 6 is an edge view thereof.

Like characters of reference designate similar parts throughout the different figures of the drawing.

The positive member of the grip, which I shall generally designate at A, is formed from a blank of resilient material such as spring steel, as shown in Figs. 4 and 5. This blank is in the form of an elongated strip which is bent upon itself at 1, where the bight is located, to form a loop, with a preferably longer limb 2 and a relatively shorter limb 3. The limb 3, has a semi-circular terminal 4, and the limb 2, has an outwardly bent terminal 5, the purpose of which will later appear.

In Fig. 1, I have shown a portion 6, of the leg of the wearer, the hose being indicated at 7, and a conventional form of garter at 8, the latter having a supporting strap of elastic or the like, as shown at 9. An eye, which is hereinafter defined as a supported member, and which is generally indicated at B, has a section 10 through which the strap 9 passes in a manner to support the eye B. This eye has what I will term a free section 11, which is specifically that portion of the eye that constitutes the passive member of the grip device, and which is thus of greatest importance irrespective of whether this passive member is a part of an endless eye or not. Strictly speaking, this free section 11, is the supported member without regard to the means employed to support it, and my invention consists of the combination of this supported member 11, and the resilient grip which I am now about to describe.

Referring to the positive member of the grip, it will be seen that the blank is tensioned so that the limbs 2 and 3 seek firm engagement with each other in such a manner as normally to reduce the diameter of the bight 1, and hence, it is necessary to spread the limbs apart from each other, in order to effect attachment or detachment, to and from the gripping position, as will later appear.

The terminal 5, performs a projecting function, as will later appear, and the corners are suitably rounded off to prevent injury to the fabric of the hose which it is designed to engage. Further, it will be noted from Fig. 2, that the longer limb 2, is disposed inside the hose and next to the leg of the wearer, and hence it is a feature to dispose the projecting or hose inserting terminal 5, on the longer limb 2, so that the slight projection of this offset terminal, inside the hose, will not objectionably catch on portions of under-garments of the wearer. It will also be noted that limb 3 is more than sufficiently reduced in length so that its terminal 4, will be above the offset terminal 5, thereby avoiding a needless bulge. While the parts are greatly exaggerated in thickness for purposes of clear structural illustration, still it will be obvious that the total thickness will be very slight, in actual practice, thereby avoiding any objectionable bulges.

The length of limbs 2 and 3, may, and will vary, with the type of grip to be made, and in accordance with the type of person to be pleased. However, in any event, these limbs will be of sufficient length to be conveniently manipulated for the purposes of attachment and detachment to and from a working position, and in any event, they will tightly engage the fabric of the hose so that this frictional engagement will function to maintain the bight 1 of the grip, in the position to which it has been placed, with respect to the section 11. That is, the limbs will not be shifted laterally from the position shown in Fig. 1.

I will next describe the manner in which the grip is attached to and detached from an operative position with respect to the hose.

As one manner of performing these functions, the user may grasp the eye 11, with the fingers of the left hand, and take the grip A in the right hand and with the thumb of the latter, it is possible to hold a portion of the margin of the hose 7, over the inserting offset end 5 and force such marginal portion through the eye 11, as shown in Fig. 3. It will now be clear why it is an advantage to have the limb 3 shorter than limb 4, so as to free the end 5, for this inserting function.

After a marginal portion of the hose has been disposed in the position shown in Fig. 3, it may be held in such position by the fingers of the left hand while the grip A is reversed, as shown in Fig. 4. After the limbs have been suitably spread, the grip A is then forced downwardly about the interposed free section 11 and the over-lapping marginal portion of the hose, with limb 2 on the inside of the hose and limb 3 on the outside. As the grip A is forced downwardly, it will hold the partly wrapped marginal hose portion in place and prevent it from detachment from section 11, and after the grip is in the final position shown in Fig. 1, the bight 1, will circumferentially engage and tightly hold and grip the hose about section 11 with a secure connection, as will now be clear.

To detach the grip A, it is merely necessary to slide the same upwardly out of engagement with the wrapped marginal portion of the hose and section 11, and in either operation, there is absolutely no danger of injuring the hose because the parts are continuously smooth.

It should now be clear why I term the section 11, the passive member of the grip since it does not have to perform any contractive or expansive function, while the positive member A, clearly performs expansive and contractive movement inherent to its resilient nature. Yet the two elements coact in an interdependent manner to perform the gripping function, and I claim the two elements in combination.

While I have herein shown and described one specific form of my invention, I do not wish to be limited thereto except for such limitations as the claims may import.

I claim:—

1. In a hose gripping device, a supported free section adapted to form one member of the hose grip and receive a folded-over margin of the hose, and a resilient loop forming the positive member of the hose grip and comprising a spring bight adapted to circumferentially grip the folded margin of the hose about said free section, and said loop having an inner limb of smooth and unbroken surface adapted to be disposed inside the hose and an outer limb of smooth and unbroken surface disposed outside the hose and said limbs being tensioned to press against each other in flat relation along the interposed hose to frictionally stabilize the position of said loop, and contract the bight about the folded margin.

2. In a hose gripping device, a supported eye having a free section adapted to receive a folded-over margin of the hose inserted through said eye, and a resilient loop comprising a spring bight adapted to circumferentially grip the folded-over margin of the hose about said free section, and said loop having a relatively long smooth flat limb adapted to be disposed inside the hose and a relatively shorter smooth flat limb adapted to be disposed outside the hose and said limbs being tensioned to press against the interposed hose to contract the bight against said folded margin and frictionally stabilize the position of said loop, said longer limb having an offset terminal free from the end of said shorter limb whereby to engage a marginal portion of the hose and insert the same through said eye before the loop has been disposed in a final gripping position.

BRUCE N. SMITH.